(12) United States Patent
Schweid et al.

(10) Patent No.: US 9,195,908 B2
(45) Date of Patent: Nov. 24, 2015

(54) SNOW CLASSIFIER CONTEXT WINDOW REDUCTION USING CLASS T-SCORES AND MEAN DIFFERENCES

(71) Applicant: Xerox Corporation, Norwalk, CT (US)

(72) Inventors: Stuart Schweid, Pittsford, NY (US); Aaron Michael Burry, Ontario, NY (US); Vladimir Kozitsky, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 328 days.

(21) Appl. No.: 13/899,705

(22) Filed: May 22, 2013

(65) Prior Publication Data

US 2014/0348391 A1 Nov. 27, 2014

(51) Int. Cl.
*G06K 9/62* (2006.01)

(52) U.S. Cl.
CPC ...................... *G06K 9/623* (2013.01)

(58) Field of Classification Search
CPC .................................. G06K 9/00624
See application file for complete search history.

(56) References Cited

U.S. PATENT DOCUMENTS

| 4,932,065 | A | 6/1990 | Feldgajer |
| 5,802,203 | A | 9/1998 | Black et al. |
| 6,553,131 | B1 | 4/2003 | Neubauer et al. |
| 6,922,156 | B2 | 7/2005 | Kavner |
| 8,059,868 | B2 | 11/2011 | Matsumoto et al. |
| 2009/0202105 | A1 | 8/2009 | Castro Abrantes et al. |
| 2012/0263352 | A1 | 10/2012 | Fan et al. |
| 2012/0275653 | A1 | 11/2012 | Hsieh et al. |
| 2013/0021578 | A1 | 1/2013 | Chen et al. |
| 2013/0028481 | A1 | 1/2013 | Wu |
| 2013/0051625 | A1 | 2/2013 | Fan et al. |
| 2013/0147959 | A1* | 6/2013 | Wang et al. ................... 348/149 |
| 2013/0162817 | A1* | 6/2013 | Bernal ........................... 348/143 |
| 2013/0182910 | A1* | 7/2013 | Burry et al. ................... 382/105 |
| 2013/0272579 | A1* | 10/2013 | Burry et al. ................... 382/105 |
| 2014/0079315 | A1* | 3/2014 | Kozitsky et al. .............. 382/159 |
| 2014/0266803 | A1* | 9/2014 | Bulan et al. ................. 340/932.2 |
| 2014/0270381 | A1* | 9/2014 | Wu et al. ....................... 382/104 |

OTHER PUBLICATIONS

Nilsson, M. et al., "The Successive Mean Quantization Transform," Acoustics, Speech, and Signal Processing, 2005. Proceedings. (ICASSP '05). IEEE International Conference on (vol. 4), Mar. 18-23.

(Continued)

*Primary Examiner* — Alan Chen
(74) *Attorney, Agent, or Firm* — Kermit D. Lopez; Luis M. Ortiz; Ortiz & Lopez, PLLC

(57) ABSTRACT

Methods, systems and processor-readable media for determining, post training, which locations of a classifier window are most significant in discriminating between class and non-class objects. The important locations can be determined by calculating the mean and standard deviation of every pixel location in the classifier context for both the positive and negative samples of the classifier. Using a combination of t-scores and mean differences, the importance of all pixel locations in the classifier score can be rank ordered. A sufficient number of pixel locations can then be selected to achieve a detection rate close enough to the full classifier for a particular application.

20 Claims, 5 Drawing Sheets

(56) References Cited

OTHER PUBLICATIONS

Nilsson, M. et al., "Face Detection Using Local SMQT Features and Split Up Snow Classifier," Acoustics, Speech and Signal Processing, 2007. ICASSP 2007. IEEE International Conference on (vol. 2), Apr. 15-20, 4 pages.

Roth, D. et al., "A SNoW-Based Face Detector," In Advances in Neural Information Processing Systems 12 (2000), pp. 855-861.

* cited by examiner

SNOW CLASSIFIER CONTEXT WINDOW REDUCTION USING CLASS T-SCORES AND MEAN DIFFERENCES

FIELD OF THE INVENTION

Embodiments are generally related to data-processing methods and systems and processor-readable media. Embodiments are also related to the field of ALPR (Automated License Plate Recognition) applications. Embodiments additionally relate to classifiers utilized in image recognition applications.

BACKGROUND

ALPR is an image-processing approach that often functions as the core module of "intelligent" transportation infrastructure applications. License plate recognition techniques, such as ALPR, can be employed to identify a vehicle by automatically reading a license plate utilizing image processing and character recognition technologies. A license plate recognition operation can be performed by locating a license plate in an image, segmenting the characters in the captured image of the plate, and performing an OCR (Optical Character Recognition) operation with respect to the characters identified.

The ALPR problem is often decomposed into a sequence of image processing operations locating the sub-image containing the license plate (i.e., plate localization), extracting images of individual characters (i.e., segmentation), and performing optical character recognition (OCR) on these character images.

Detection of license plates within a larger vehicle image is a critical step in an automated license plate recognition process. Here it is important to ensure that the true positive rate is extremely high, we don't want to miss plates since these typically translate into revenue (e.g., for tolling applications). However, at the same time the false alarm rate must be kept low since each candidate license plate sub-image will then be subjected to much more intensive processing: segmentation of characters and attempted OCR. A preferred solution for automatic license plate technology uses a SNoW classifier with SMQT features to detect license plates within a captured image. The SNoW classifier is highly accurate and easy to train so it is highly desirable as a classification method. There is very little computation involved in implementing a trained classifier, but the context size of the classifier is large. This results in significant real time to calculate the score used for detection. This limitation reduces the usefulness of the classifier in high speed/bandwidth applications (e.g., heavy traffic).

SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved classifier methods and systems.

It is another aspect of the disclosed embodiments to provide methods and systems determining, post training, which locations of the classifier window are most significant in discriminating between the class and non class objects.

The aforementioned aspects and other objectives and advantages can now be achieved as described herein. Methods and systems are disclosed for determining, post training, which locations of a classifier window are most significant in discriminating between class and non-class objects. The important locations can be determined by calculating the mean and standard deviation of every pixel location in the classifier context for both the positive and negative samples of the classifier. Using a combination of t-scores and mean differences, the importance of all pixel locations in the classifier score can be rank ordered. A sufficient number of pixel locations can then be selected to achieve a detection rate close enough to the full classifier for a particular application.

BRIEF DESCRIPTION OF THE FIGURES

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
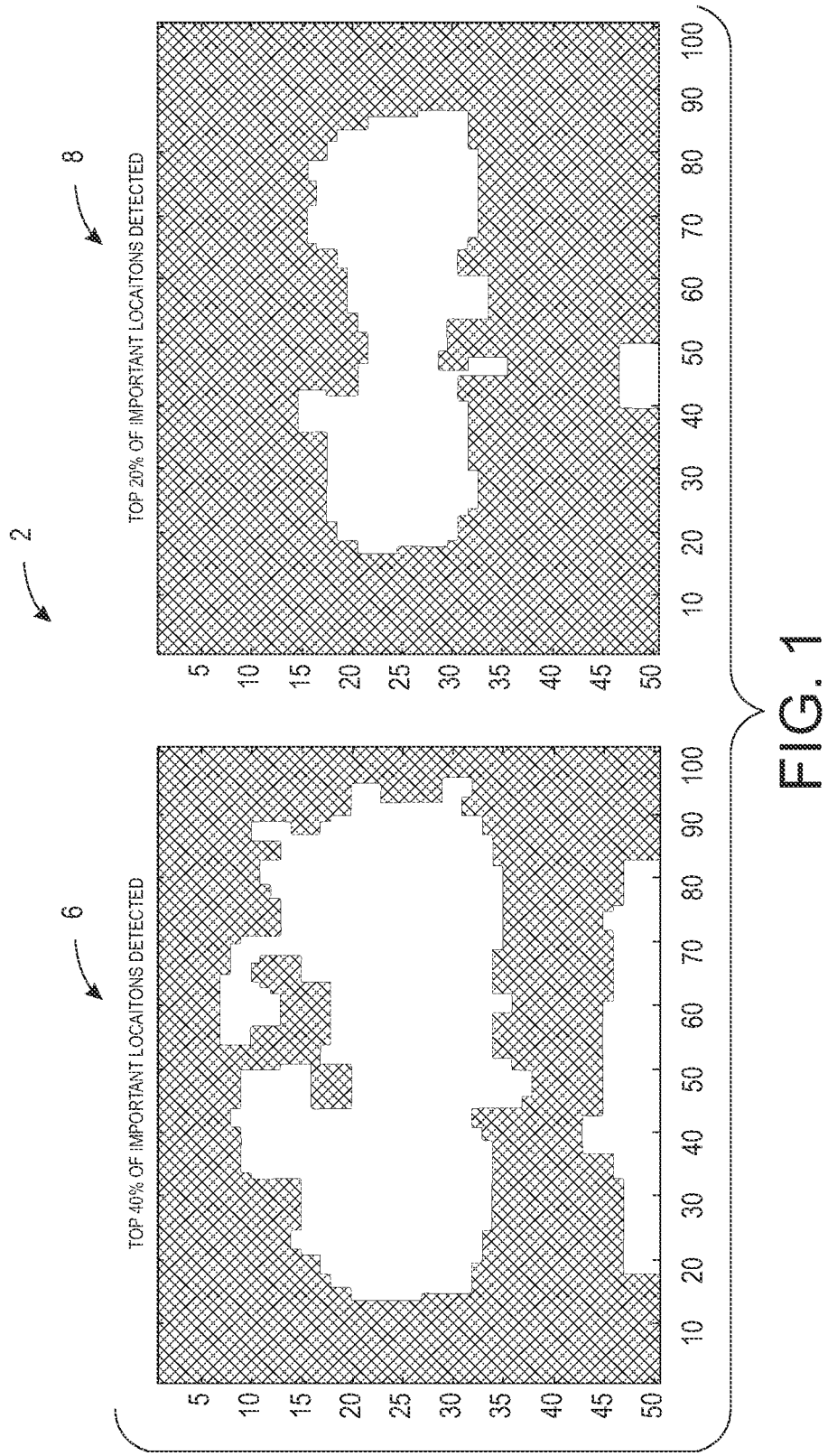
FIG. 1 illustrates a group of context windows that indicate with respect to example license plate detection operations, detected important locations within a rectangular context window, in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The disclosed embodiments are described in part below with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

This disclosed approach provides a method to determine, post training, which locations of the classifier window are most significant in discriminating between the class and non-class objects. This approach focuses strictly on the sum of the weights used by the classifier, which is the only metric valuable in determining the efficacy of the reduced context window.

Typical techniques of data reduction, such as PCA, are not applicable here. In PCA weighted combination of the input (via eigenvectors) are used to reduce the dimensionality of the problem. In this application the advantage is obtained by only considering a subsample of the context window, not reducing the dimensionality by projecting the context onto a smaller subspace.

Additionally, in conjunction with PCA there are techniques for determining the best reconstruction (measured by SSE) of the full weights from a small subset of those weights. Again the techniques used here are both computationally expensive and not applicable to this problem. The classifier metric of summed weights is the only measure of importance, all higher dimensionality information is not considered.

Since only the sum of the weights is considered, locations that have different means between the positive and negative examples should be important contributors to classification. Clearly they don't have to be as the correlation between locations is unknown. It is possible that a large mean difference at one location can be systematically offset by a large difference in the opposite direction (via negative correlation) at another location. This did not seem to be the case in the training set analyzed, so making an independent assumption is reasonable (limitations to this assumption are addressed later).

The important locations of the classifier are determined utilizing the weighted mean and standard deviation at every location in the classifier context for all the positive and negative examples. Location importance can be estimated utilizing both the mean difference between positive and negative examples at that location as well as a t-score like measurement. The t-score is useful because it provides a S/N like metric: it is an interclass versus an intra-class measure, which correlates to discrimination ability. By utilizing a combination of t-score like measurements and mean differences, the importance of all locations in the classifier score can be rank ordered. A sufficient number can then be selected to achieve a detection rate close enough to the full classifier for a particular application.

For a given location of the classifier context, a t-score like attribute can be calculated according to equation (1) below:

$$t_{loc} = |m_{pos} - m_{neg}|/(s^2_{pos} + s^2_{neg})^{0.5} \quad (1)$$

wherein m is the mean of the weights of the example set (positive or negative) at that location and $s^2$ is the variance of the weights of the example set.

Additionally, the mean difference between the two classes is also considered as a metric. For a given location, meandiff can be calculated according to equation (2) below:

$$\text{meandiff}_{loc} = |m_{pos} - m_{neg}| \quad (2)$$

While there tends to be a very strong overlap between locations that have large mean difference and those that have large t-scores, there is not a 1 to 1 mapping. For a given pair of locations, one location may have a higher ranking than the other in its t-score measure while the second has a higher mean difference ranking. Since either mean difference or t-score measure can be indicative of a distinguishing feature, the results of metrics from (1) and (2) are sorted independently and the largest of each set are chosen. The final group of important locations is determined by finding the union of the subsets of each of the sets.

The analysis clearly does not consider any correlation between locations, the significant locations are chosen independently based upon both their t-scores and their mean differences. A problem may occur, however, in that the locations adjacent to a significant location may not be included even though there is definitely a correlation between adjacent (8 NN) locations. The correlation is ensured because the feature of a location is determined using video of the 8 NN of that location (and the video of the location itself). Nearest 4 neighbors therefore share 6 out of the 9 video values used in the calculation of their feature (SMQT) at that location, and thus independence for nearest neighbors is not a good estimate. With the exception of its 8 NN independence of a location with all other locations in the context window is assumed.

To account for the correlation between the 8 NN morphological filtering is applied to the important location map to include its neighbors. First an opening is done to eliminate isolated important locations. Since desired features tend to have a larger spatial support, isolated locations are determined not to have significant impact. The opening removes these locations from consideration. Additionally a dilation is performed to include locations that are next to important ones but did not pass equations (1) or (2). The dilation ensures that all significant locations have their neighbors (which have correlated) included in the score calculation.

FIG. 1 illustrates a group 2 of context windows 6, 8 that indicate with respect to example license plate detection operations, the detected important locations within a rectangular context window (i.e., window 6 or 8), in accordance with an example embodiment. Note that the disclosed method/algorithm tends to place the greatest importance for license plate detection in the center, where the characters are located. Additionally, weight is given at the bottom of the context where additional text and structure is typically introduced by license plate frames. When forced to eliminate some locations, however, in an example embodiment, the algorithm chose to remove the license frame and retain the area of the characters, as expected.

Figure 2:
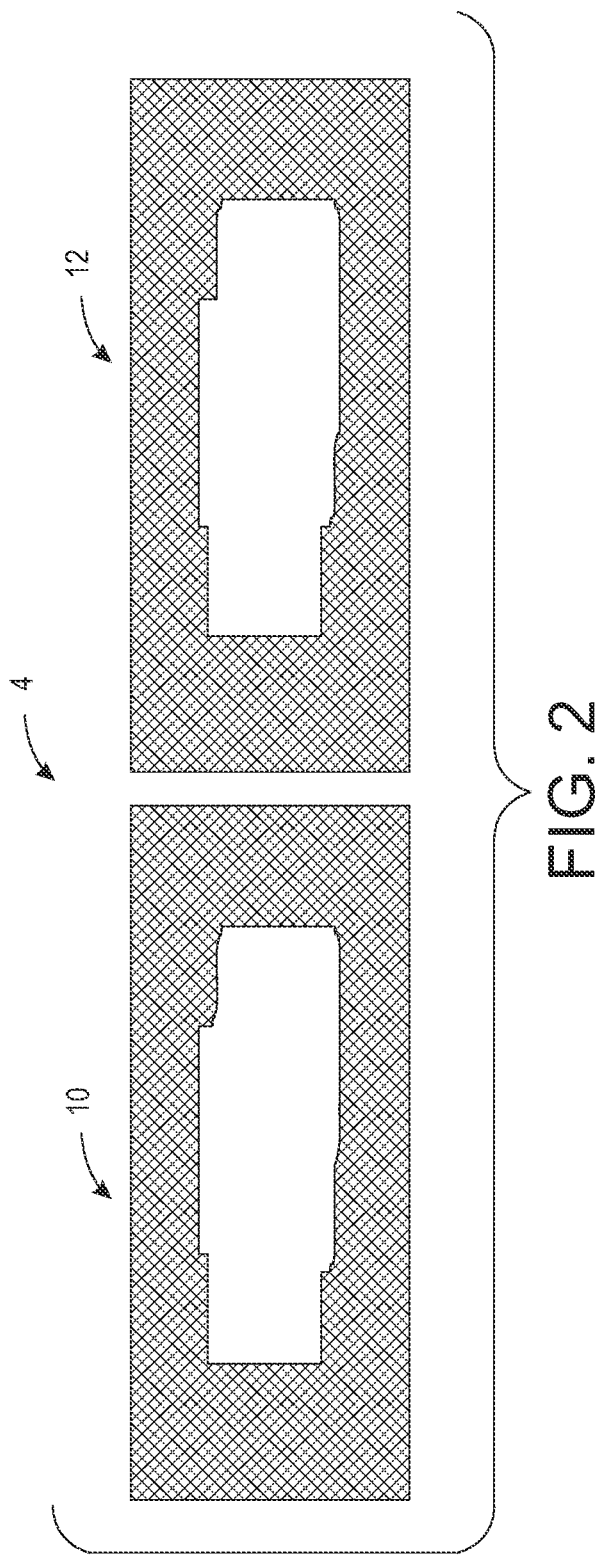
FIG. 2 illustrates the detection of a license plate in a scene with respect to detection results, in accordance with an embodiment.

FIG. 2 illustrates the detection 4 of a license plate in a scene with respect to detection results 10 and 12, in accordance with an embodiment. In FIG. 2, the figure on the left (i.e., classification result 10) corresponds to detection using the full SNoW classifier while the detection on the right (classification result 12) only uses 20% of the locations in calculating the classifier metric. Note that the two classifications 10, 12 are virtually identical.

The disclosed approach can be further improved by going back and retraining the classifier using only the important locations in the training instead of the whole window. This retraining will restore any lost information thrown away in the location elimination stage that actually has discriminating power by disallowing the error diffusion into unimportant locations and emphasizing training convergence on the highly discriminating locations. The retraining should be extremely fast, as the initialization for the training can be the output of this location reduction method, not a time zero weight initialization. This will greatly reduce the number of iterations for convergence.

One embodiment can involve initial deployment with all locations active and iteratively locations would be deactivated over time as a function of factors unique to a particular installation. These factors can include both fundamental hardware contributors such as camera mounting geometry, illuminator/lens interactions, and location specific factors such as types of plates observed and types of vehicles. These factors are unique to each individual installation and the application of this invention locally vs globally would further improve detection performance along with the added real-time throughput benefits. The throughput would be reduced at first as is typical with initial installations and ramped up over time to handle the full load.

Figure 3:
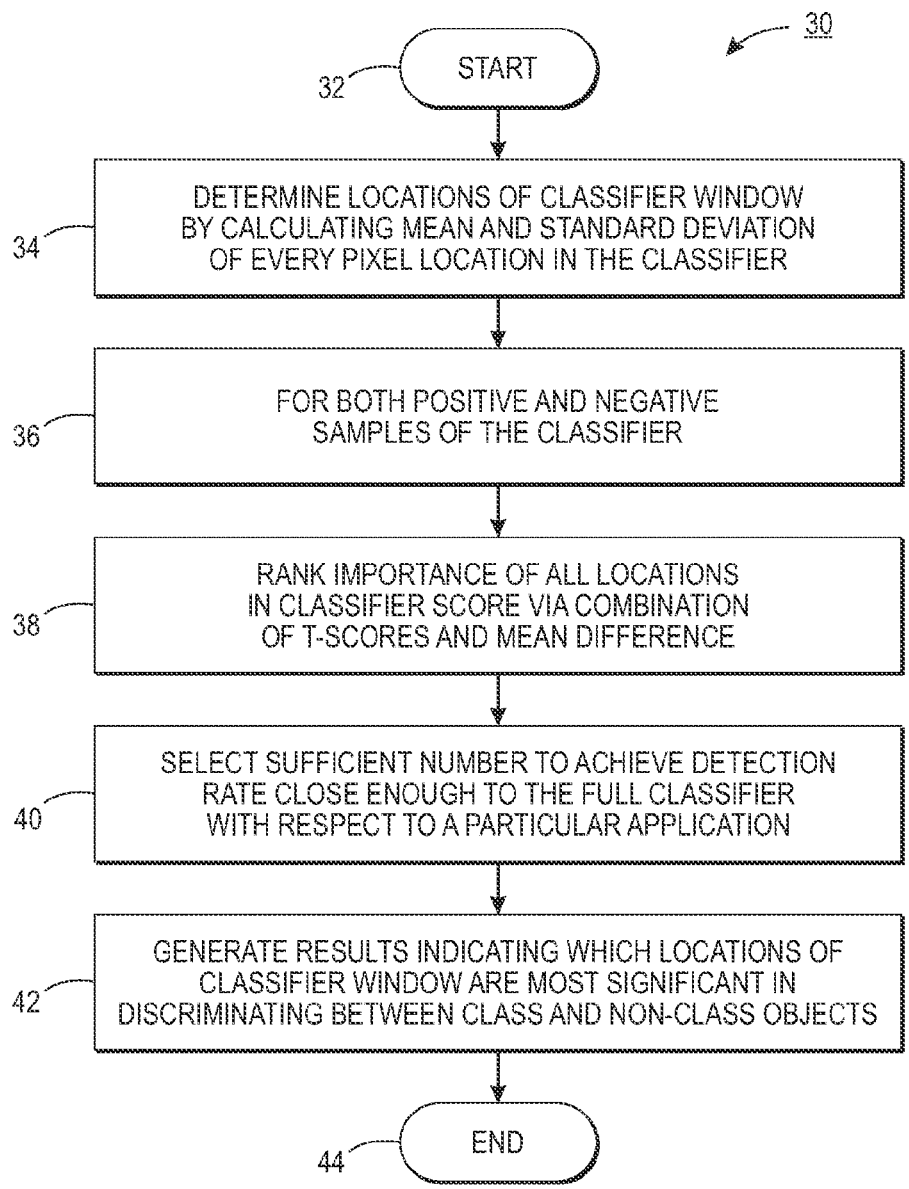
FIG. 3 illustrates a high-level flow chart of operations depicting logical operational steps of a method to determine which locations of a classifier window are most significant in discriminating between class and non-class objects, in accordance with a preferred embodiment.

FIG. 3 illustrates a high-level flow chart of operations depicting logical operational steps of a method 30 that can determine which locations of a classifier window are most significant in discriminating between class and non-class objects, in accordance with a preferred embodiment. As shown at block 32, the process can be initiated. Then, as indicated at block 34, a step or logical operation can be implemented to determine "important" locations of the classifier window by calculating the mean and standard deviation of every pixel location in the classifier context for, as indicated at block 36, both the positive and negative samples of the classifier.

Then, as depicted at block 38, a step or logical operation can be implemented to rank order the importance of all locations in the classifier score using a combination of t-scores and mean differences. A sufficient number can then be selected, as shown at block 40, to achieve a detection rate close enough to the full classifier for a particular application. Thereafter, as depicted at block 42, results can be generated indicating which locations of the classifier window are most significant in discriminating between class and non-class objects. The process can then end, as depicted at block 44. The approach of method 30 thus focuses strictly on the sum of the weights used by the classifier, which is the only metric valuable in determining the efficacy of the reduced context window.

Note that the reduction of the required feature space is critical to enabling the SNoW classifier with SMQT features for a number of transportation applications (e.g., license plate detection, face detection for vehicle occupancy measurement, etc.). There are several reasons why this feature reduction is so critical. First, it enables a substantial reduction in the real-time overhead required for computing the raw classifier sums. This is key for many transportation applications that require real-time processing of images as vehicles move through target zones. Second, it reduces the size on disk of the stored SNoW classifier weights, which is a known problem for this type of classifier. Reducing the size of the weight matrix also enables extensions of the classification approach that would otherwise be prohibitive. Two examples would be enabling the use of higher bit depths for the SMQT features and performing the classification/detection at higher image resolutions (i.e. larger template sizes).

Figure 4:
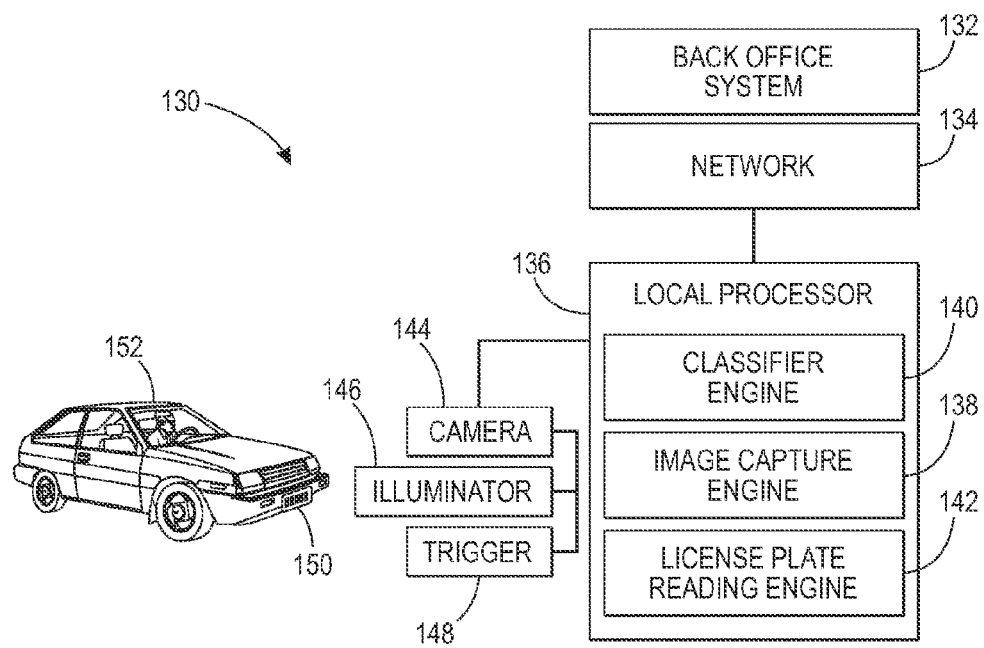
FIG. 4 illustrates a high-level block diagram of an ALPR system for identifying a license plate image, in accordance with an alternative embodiment.

FIG. 4 illustrates a high-level system diagram of an ALPR system 130 that can be adapted for use in accordance with the disclosed embodiments. It can be appreciated that although ALPR is discussed herein, the disclosed embodiments are not limited to ALPR application. That is, the disclosed embodiments can be utilized for other applications such as face detection for vehicle occupancy measurements along with other applications. For illustrative purposes, however, ALPR system 130 and ALPR applications are referred to herein to provide some context and examples of how the disclosed embodiments can be implemented.

Thus, the system 130 depicted in FIG. 4 generally includes or can be used with a vehicle 152 with a license plate 150. System 130 includes a trigger 148, a camera 144, and an illuminator 146 for capturing an image. System 130 further includes a local processor 136 that includes an image capture engine 138, a license plate reading engine 142, and a classifier engine 140. System 130 can further include a network 134 (e.g., a local wireless network, the Internet, cellular communications network, other data network, etc.), and a back office system 132 for processing transactions and managing patron accounts. The local processor 136 can communicate with the back office system 132 via the network 134.

In FIG. 4, the license plate 150 is depicted located on the front of the vehicle 152, but the license plate 150 could also be located on the rear of the vehicle 152 as well. Some states (e.g., Texas) require license plates in both places, i.e., at the rear and front of a vehicle. In one scenario, the vehicle 152 enters a license plate reading zone which contains a trigger device 148 which controls an illuminator 146 which illuminates the license plate region of the vehicle 152, and a camera 144 which captures images of the license plate 150 on the vehicle 152. The camera 144 can be connected to and/or communicate with the local processor unit 136. The classifier engine 140 can, for example, perform the steps or logical operations shown in the blocks depicted in FIG. 3.

The image capture engine 138 controls the trigger 148, illuminator 146, and camera 144 in order to properly image the vehicle 152 and the license plate 150. Engine 140 can implement a SNoW classifier context window reduction methodology using class t-scores and mean differences as described herein. An image of the license plate 150 along with classifier data thereof can then be sent by the local processor 136 over the network 134 to the back office system 132. The back office system 132 can then process the license plate and state jurisdiction data and can assess a toll or otherwise interact with a patron account or takes other transportation application specific actions.

As will be appreciated by one skilled in the art, the disclosed embodiments can be implemented as a method, data-processing system, or computer program product. Accordingly, the embodiments may take the form of an entire hardware implementation, an entire software embodiment or an embodiment combining software and hardware aspects all generally referred to as a "circuit" or "module" or "engine". For example, an "engine" as discussed may be a software module. Examples of such engines and/or modules include the image capture engine 138, the classifier engine 140, and license plate reading engine 142 shown in FIG. 4, to name a few.

Furthermore, the disclosed approach may take the form of a computer program product on a computer-usable storage medium having computer-usable program code embodied in the medium. Any suitable computer readable medium may be utilized including hard disks, USB flash drives, DVDs, CD-ROMs, optical storage devices, magnetic storage devices, etc.

Computer program code for carrying out operations of the present invention may be written in an object oriented programming language (e.g., JAVA, C++, etc.). The computer program code, however, for carrying out operations of the present invention may also be written in conventional procedural programming languages such as the "C" programming language or in a visually oriented programming environment such as, for example, Visual Basic.

The program code may execute entirely on the user's computer or mobile device, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., WiFi, WiMax, 802.11x, and cellular network or the connection can be made to an external computer via most third party supported networks (e.g., through the Internet via an internet service provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data-processing apparatus to produce a machine such that the instructions, which execute via the processor of the computer or other programmable data-processing apparatus, create means for implementing the functions/acts specified in the block or blocks discussed herein such as, for example, the various instructions, modules, etc., discussed herein.

These computer program instructions may also be stored in a computer-readable memory that can direct a computer or other programmable data-processing apparatus to function in a particular manner such that the instructions stored in the computer-readable memory produce an article of manufacture including instruction means which implement the function/act specified in the block or blocks.

The computer program instructions may also be loaded onto a computer or other programmable data-processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 5:
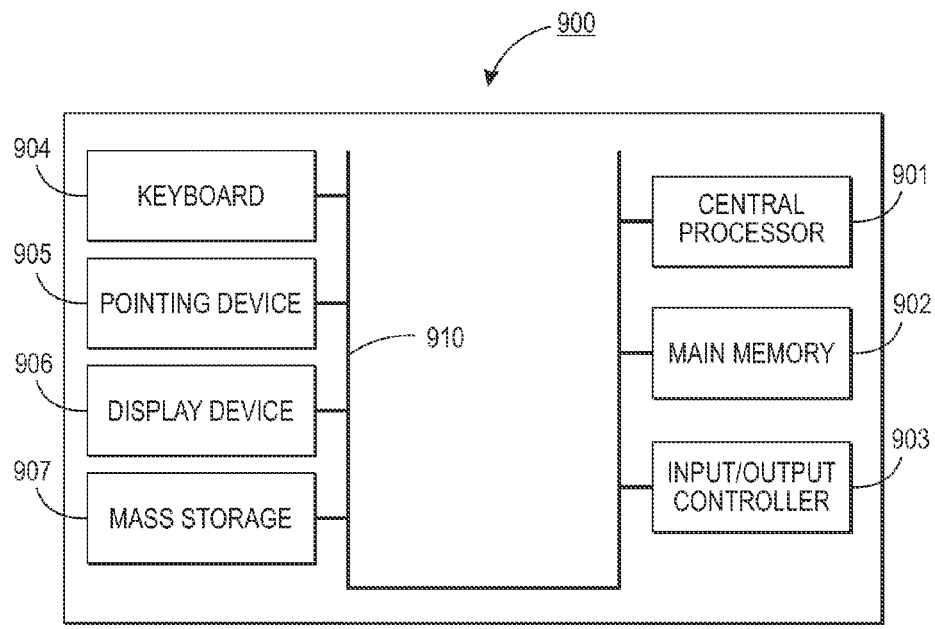
FIG. 5 illustrates a schematic view of a software system including an ALPR module using augmented data, an operating system, and a user interface, in accordance with the disclosed embodiments.
Figure 6:
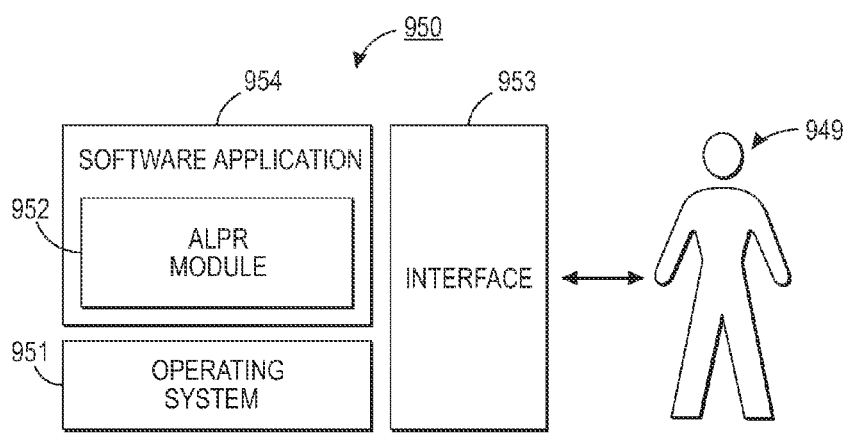
FIG. 6 illustrates a computer software system, which may be employed in some embodiments for directing the operation of the data-processing system depicted in FIG. 5.

FIGS. 5-6 are provided as exemplary diagrams of data-processing environments in which embodiments of the present invention may be implemented. It should be appreciated that FIGS. 5-6 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 5, the disclosed embodiments may be implemented in the context of a data-processing system 900 that includes, for example, a central processor 901 (or other processors), a main memory 902, an input/output controller 903, and in some embodiments, a USB (Universal Serial Bus) or other appropriate peripheral connection. System 900 can also include a keyboard 904, an input device 905 (e.g., a pointing device such as a mouse, track ball, pen device, etc.), a display device 906, and a mass storage 907 (e.g., a hard disk). As illustrated, the various components of data-processing system 900 can communicate electronically through a system bus 910 or similar architecture. The system bus 910 may be, for example, a subsystem that transfers data between, for example, computer components within data-processing system 900 or to and from other data-processing devices, components, computers, etc.

It can be appreciated that in some embodiments the processor 901 may process instructions from, for example, the image capture engine 138, the classifier engine 140, and the license plate reading engine 142, as shown in FIG. 4, and that in fact, the data-processing system 900 may function as the local processor 136, or, for example, the back office system 132, as shown in FIG. 4, and further can communicate with, for example, the camera 144, the illuminator 146, the trigger 148, and so forth, as shown as the example ALPR system 130 depicted in FIG. 4.

FIG. 6 illustrates a computer software system 950, which may be employed for directing the operation of the data-processing system 900 depicted in FIG. 5. Software application 954, stored in main memory 902 and on mass storage 907 generally can include and/or can be associated with a kernel or operating system 951 and a shell or interface 953. One or more application programs, such as module(s) 952, may be "loaded" (i.e., transferred from mass storage 907 into the main memory 902) for execution by the data-processing system 900. In the example shown in FIG. 6, module 952 can be implemented as, for example, a module that performs various ALPR logical instructions or operations such as those shown in, for example, FIG. 3, and described with respect to other figures herein. In some embodiments, the ALPR module 952 can be composed of multiple modules or software engines such as, for example, the classifier engine 140, the image capture engine 138, and/or the license plate reading engine 142 depicted in FIG. 4.

The data-processing system 900 can receive user commands and data through user interface 953 accessible by a user 949. These inputs may then be acted upon by the data-processing system 900 in accordance with instructions from operating system 951 and/or software application 954 and any software module(s) 952 thereof.

The discussion herein is thus intended to provide a brief, general description of suitable computing environments in which the system and method may be implemented. Although not required, the disclosed embodiments will be described in the general context of computer-executable instructions such as program modules being executed by a single computer. In most instances, a "module" constitutes a software application.

Generally, program modules (e.g., module 952) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, mini-computers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 953 (e.g., a graphical user interface) can serve to display results, whereupon a user may supply additional inputs or terminate a particular session. In some embodiments, operating system 951 and interface 953 can be implemented in the context of a "windows" system. It can be appreciated, of course, that other types of systems are possible. For example, rather than a traditional "windows" system, other operating systems such as, for example, a real time operating system (RTOS) more commonly employed in wireless systems may also be employed with respect to operating system 951 and interface 953. The software application 954 can include, for example, an ALPR module 952, which can include instructions for carrying out various steps, logical operations, and/or modules discussed herein.

FIGS. 5-6 are thus intended as examples and not as architectural limitations of disclosed embodiments. Additionally, such embodiments are not limited to any particular application or computing or data-processing environment. Instead, those skilled in the art will appreciate that the disclosed approach may be advantageously applied to a variety of systems and application software. Moreover, the disclosed embodiments can be embodied on a variety of different computing platforms including Macintosh, Unix, Linux, and the like.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for determining important locations of a classifier, said method comprising:
calculating a mean deviation and a standard deviation of every pixel location in a classifier with respect to positive and negative samples associated with said classifier;
ranking an importance of all pixel locations calculated with respect to said classifier based on a combination of t-scores and mean differences; and
selecting a number of said locations to achieve a detection rate for said classifier for a particular application in order to determine which locations of said classifier are involved in discrimination between class objects and non-class objects.

2. The method of claim 1 further comprising determining at least one t-score among said t-scores according to an equation: $t_{loc}=|m_{pos}-m_{neg}|/(s^2_{pos}+s^2_{neg})^{0.5}$ wherein m is a mean of weights of an example set at a particular location and $s^2$ is a variance of weights of said example set.

3. The method of claim 2 wherein said example set comprises positive values or negative values.

4. The method of claim 1 wherein at least one mean difference among said mean differences comprises a mean difference between said class objects and said non-class objects.

5. The method of claim 4 further comprising calculating said at least one mean difference for a particular location according to an equation: $meandiff_{loc}=|m_{pos}-m_{neg}|$.

6. The method of claim 1 wherein said classifier comprises a SNoW classifier.

7. The method of claim 6 wherein said SNoW classifier is utilized in a high-speed/high-bandwidth application.

8. A system for determining important locations of a classifier, said system comprising:
a processor;
a data bus coupled to said processor; and
a computer-usable medium embodying computer program code, said computer-usable medium being coupled to said data bus, said computer program code comprising instructions executable by said processor and configured for:
calculating a mean deviation and a standard deviation of every pixel location in a classifier with respect to positive and negative samples associated with said classifier;
ranking an importance of all pixel locations calculated with respect to said classifier based on a combination of t-scores and mean differences; and
selecting a number of said locations to achieve a detection rate for said classifier for a particular application in order to determine which locations of said classifier are involved in discrimination between class objects and non-class objects.

9. The system of claim 8 wherein said instructions are further configured for determining at least one t-score among said t-scores according to an equation: $t_{loc}=|m_{pos}-m_{neg}|/(s^2_{pos}+s^2_{neg})^{0.5}$ wherein m is a mean of weights of an example set at a particular location and $s^2$ is a variance of weights of said example set.

10. The system of claim 9 wherein said example set comprises positive values or negative values.

11. The system of claim 8 wherein at least one mean difference among said mean differences comprises a mean difference between said class objects and said non-class objects.

12. The system of claim 11 wherein said instructions are further configured for calculating said at least one mean difference for a particular location according to an equation: $meandiff_{loc}=|m_{pos}-m_{neg}|$.

13. The system of claim 8 wherein said classifier comprises a SNOW classifier.

14. The system of claim 13 wherein said SNoW classifier is utilized in a high-speed/high-bandwidth application.

15. A non-transitory processor-readable medium storing code representing instructions to cause a process to determine important locations of a classifier, said code comprising code to:
calculate a mean deviation and a standard deviation of every pixel location in a classifier with respect to positive and negative samples associated with said classifier;
rank an importance of all pixel locations calculated with respect to said classifier based on a combination of t-scores and mean differences; and
select a number of said locations to achieve a detection rate for said classifier for a particular application in order to determine which locations of said classifier are involved in discrimination between class objects and non-class objects.

16. The processor-readable medium of claim 15 wherein said code further comprises code to determine at least one t-score among said t-scores according to an equation: $t_{loc}=|m_{pos}-m_{neg}|/(s^2_{pos}+s^2_{neg})^{0.5}$ where m is a mean of weights of an example set at a particular location and $s^2$ is a variance of weights of said example set.

17. The processor-readable medium of claim 16 wherein said example set comprises positive values or negative values.

18. The processor-readable medium of claim 15 wherein at least one mean difference among said mean differences comprises a mean difference between said class objects and said non-class objects.

19. The processor-readable medium of claim 18 wherein said code further comprises code to calculate said at least one mean difference for a particular location according to an equation: $\text{meandiff}_{loc}=|m_{pos}-m_{neg}|$.

20. The processor-readable medium of claim 15 wherein said classifier comprises a SNoW classifier and wherein said SNoW classifier is adapted for use in a high-speed/high-bandwidth application.

\* \* \* \* \*